United States Patent [19]
Taylor

[11] Patent Number: 5,872,744
[45] Date of Patent: *Feb. 16, 1999

[54] BATTERY ARRANGEMENT FOR A WRIST-CARRIED RADIOTELEPHONE

[75] Inventor: Terrance Nelson Taylor, Glenview, Ill.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 690,602

[22] Filed: Jul. 31, 1996

[51] Int. Cl.⁶ .............................. G04B 47/02; G04B 1/00; G04B 37/00

[52] U.S. Cl. .......................... 368/13; 368/204; 368/282; 224/164

[58] Field of Search ................................ 368/10, 13, 203, 368/204, 276, 281–282; 224/164, 165–178, 179; 379/90, 428

[56] References Cited

U.S. PATENT DOCUMENTS

| | | |
|---|---|---|
| 3,032,651 | 6/1962 | Gisiger-Stahli et al. . |
| 3,971,206 | 7/1976 | Martino . |
| 3,977,176 | 8/1976 | Murakami et al. ...................... 368/204 |
| 4,023,347 | 5/1977 | Haber . |
| 4,130,987 | 12/1978 | Schickedanz . |
| 4,141,074 | 2/1979 | Popper .................................... 364/705 |
| 4,334,315 | 6/1982 | Ono et al. . |
| 4,754,285 | 6/1988 | Robitaille . |
| 4,821,532 | 4/1989 | Jaques et al. . |
| 4,847,818 | 7/1989 | Olsen . |
| 5,008,864 | 4/1991 | Yoshitake . |
| 5,235,560 | 8/1993 | Seager . |
| 5,235,561 | 8/1993 | Seager . |
| 5,239,521 | 8/1993 | Blonder . |
| 5,265,265 | 11/1993 | Hama et al. . |
| 5,615,179 | 3/1997 | Yamamoto et al. ..................... 368/281 |

*Primary Examiner*—Vit Miska
*Attorney, Agent, or Firm*—Kevin D. Kaschke

[57] ABSTRACT

A wrist-carried radiotelephone (10) comprises a housing (12), radiotelephone circuitry (90) and a bracelet (16). The radiotelephone circuitry (90) is disposed in the housing (12). The bracelet (16) is connected to the housing (12) and secures the housing (12) to a user's wrist. The bracelet (16) further comprises a plurality of links (18, 20, 22, 24). Each link (18, 20, 22, 24) of the plurality of links (18, 20, 22, 24) has a battery (26, 28, 30, 32) disposed therein. Adjacent links (18, 20, 22, 24) of the plurality of links (18, 20, 22, 24) are mechanically coupled together using a hinge (72, 74). Adjacent batteries (26, 28, 30, 32), disposed in respective adjacent links (18, 20, 22, 24) of the plurality of links (18, 20, 22, 24), are electrically coupled together using electrical conductors (50, 52, 58, 60). The batteries (26, 28, 30, 32) disposed in the links (18, 20, 22, 24) provide power to the radiotelephone circuitry (90). The distribution of the batteries (26, 28, 30, 32) among the links (18, 20, 22, 24) provide a reasonable amount of power for cellular type radiotelephone circuitry (90) while providing an aesthetically pleasing design.

10 Claims, 2 Drawing Sheets

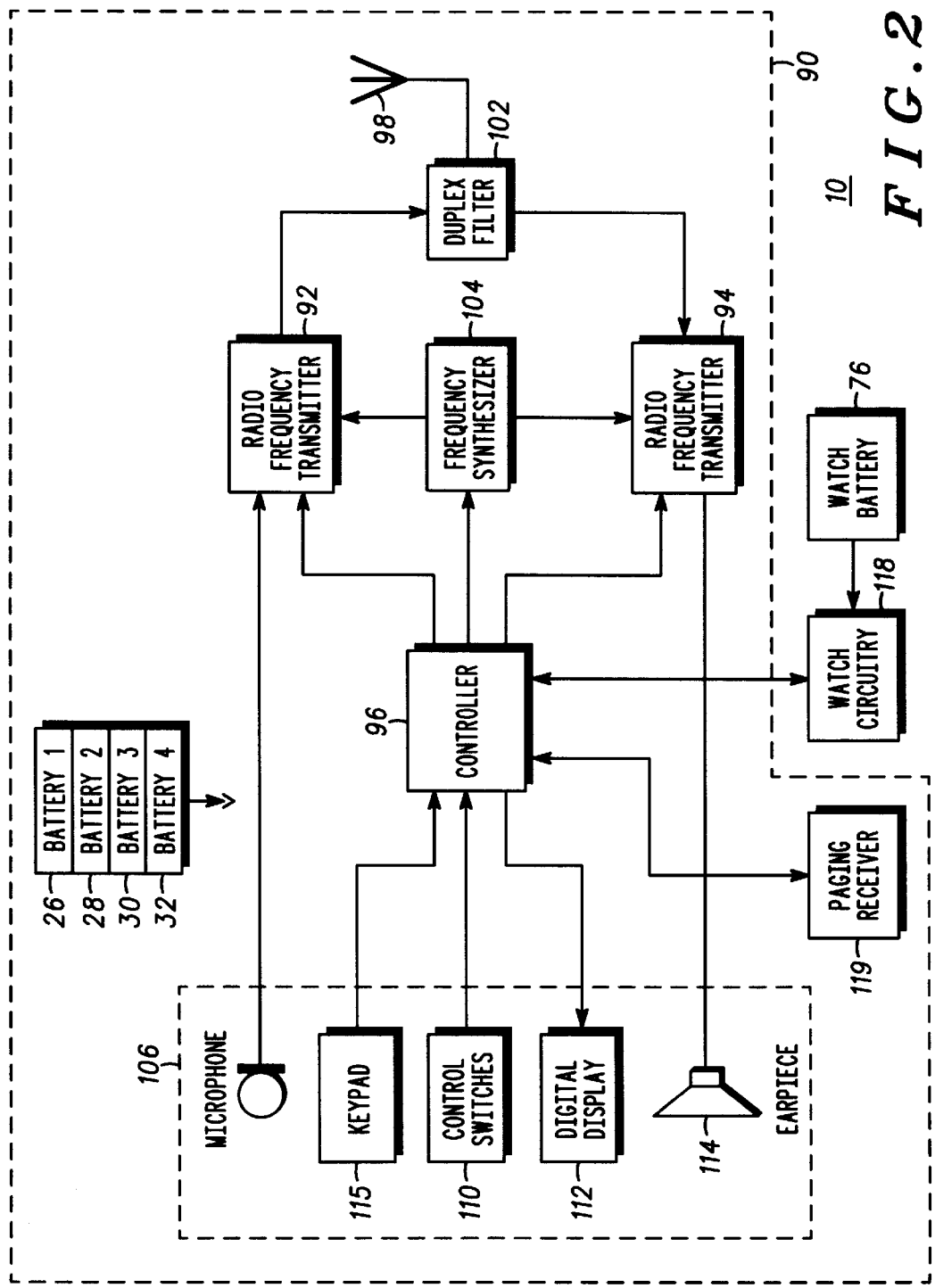

BATTERY ARRANGEMENT FOR A WRIST-CARRIED RADIOTELEPHONE

FIELD OF THE INVENTION

The present invention relates generally to wrist-carried radiotelephones, and more particularly to a battery arrangement for a wrist-carried radiotelephone.

BACKGROUND OF THE INVENTION

Recent progress in microelectronics has promoted the miniaturization of portable telephone components such as transmitters and receivers. This miniaturization has permitted the integration of these components into wrist-carried portable radiotelephones. Batteries are required to provide power for the components in a wrist-carried portable radiotelephone, because it is indeed portable.

Batteries are known to power other wrist-carried portable devices, such as wrist watches. Typically only one small battery is needed to power a wrist-carried portable watch because of low power requirements of wrist-carried portable watches. U.S. Pat. No. 3,971,206 shows two batteries, which power watch circuitry, located in a recess of a continuous flexible band.

Radiotelephones, however, have much higher power requirements. For example, a typical portable cellular radiotelephone is specified to operate at a maximum of 0.6 W. The majority of the power in a radiotelephone is consumed by a radio frequency (RF) transceiver circuitry. The radiotelephone must have enough power for a transmitter to transmit RF signals to a remote base station. The radiotelephone must also have enough power for the receiver to receive RF signals from a remote base station and to wait to receive RF signals in a standby mode of operation. Therefore, radiotelephones need more batteries or larger batteries to provide more power.

In wrist-carried portable radiotelephones, a battery which powers the radiotelephone circuitry is generally shown to be located either in a main case or in a hollow wrist band. U.S. Pat. Nos. 5,265,265 and 5,008,864 each show a battery located in a main case attached to a wrist strap. U.S. Pat. No. 3,032,651 shows several batteries located together in a single hollow wrist clip.

At the present state of development of cellular radiotelephone circuitry, in particular, one battery located in the main case or a few small batteries located together in a single hollow wrist clip does not provide sufficient power to operate the radiotelephone circuitry over a reasonable amount of time. Solving this problem by adding more batteries or larger batteries is difficult to do without adversely affecting the aesthetic appearance of the wrist-carried portable radiotelephone.

Accordingly, there is a need for a battery arrangement suitable for a wrist-carried radiotelephone which provides a reasonable amount of power to operate the radiotelephone circuitry and also has an aesthetic appearance.

BRIEF DESCRIPTION OF THE DRAWINGS

FIG. 2 illustrates a block diagram of the wrist-carried radiotelephone.

DETAILED DESCRIPTION OF THE PREFERRED EMBODIMENTS

Figure 1:
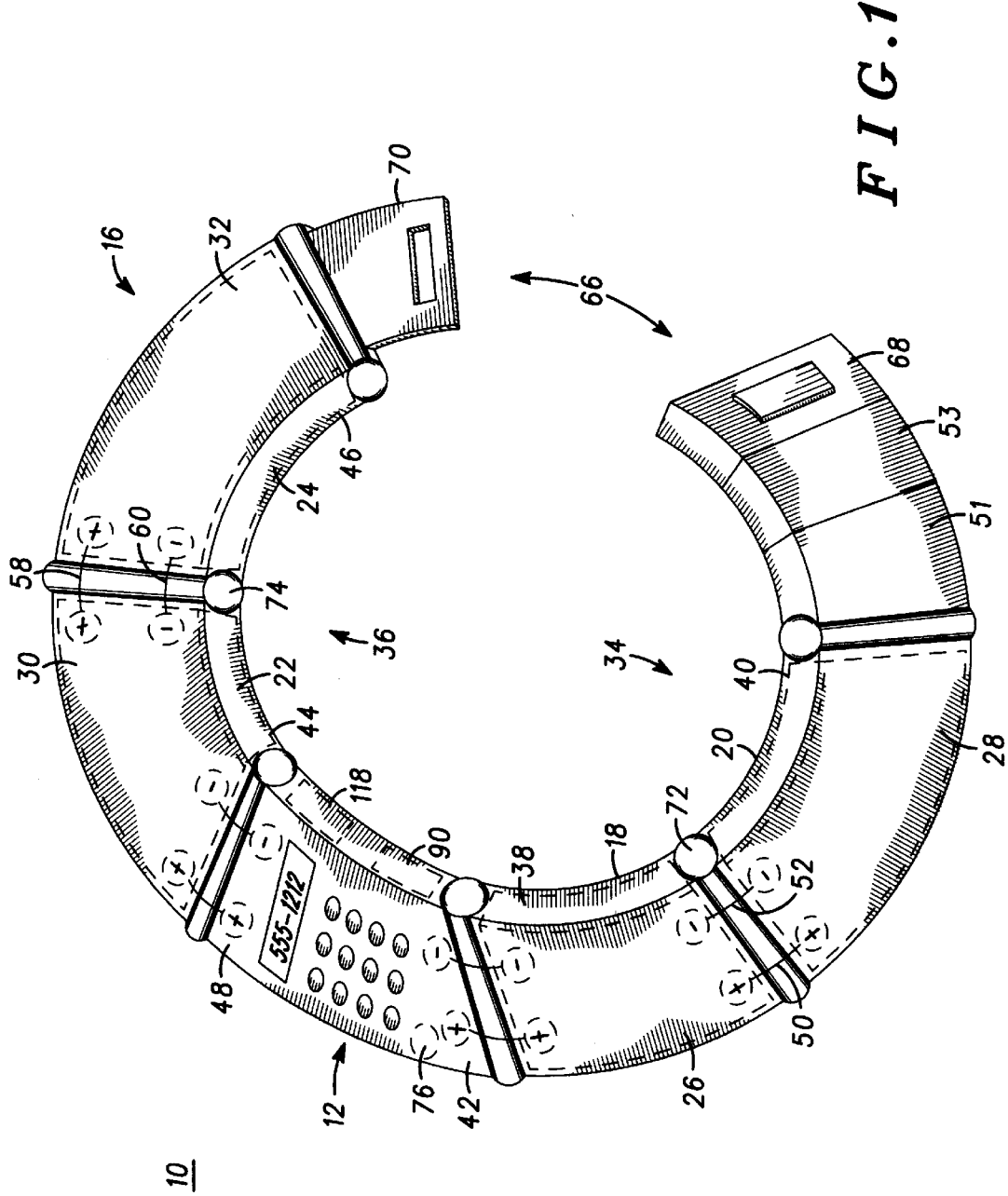
FIG. 1 illustrates a perspective view of a wrist-carried radiotelephone including a battery arrangement.

FIG. 1 illustrates a perspective view of a wrist-carried radiotelephone 10 including a battery arrangement. A radiotelephone is a device which communicates information using electromagnetic waves in the radio frequency range. Wrist-carried means that a device is strapped to or otherwise secured to a person's wrist. Therefore, the wrist-carried radiotelephone 10 is a radiotelephone adapted to be secured to a user's wrist to provide portable, lightweight and convenient access to radiotelephone communications.

The wrist-carried radiotelephone 10 comprises a housing 12, radiotelephone circuitry 90 (see FIG. 2) and a bracelet 16. The radiotelephone circuitry 90 is disposed in the housing 16. The bracelet 16 is connected to the housing 12 and secures the housing 12 to a user's wrist (not shown). The bracelet 16 further comprises a plurality of links 18, 20, 22, 24. Each link 18, 20, 22, 24 of the plurality of links 18, 20, 22, 24 has a battery 26, 28, 30, 32 disposed therein. Adjacent links 18, 20 or 22, 24 of the plurality of links 18, 20, 22, 24 are mechanically coupled together to give the bracelet 16. Adjacent batteries 26, 28, disposed in respective adjacent links 18, 20 of the plurality of links 18, 20, 22, 24, are electrically coupled together. The batteries 26, 28, 30, 32 disposed in the links 18, 20, 22, 24 provide power to the radiotelephone circuitry 90.

The batteries 26, 28, 30, 32 are preferably of the lithium polymer type. An advantage of this type of battery is that it can be formed instead of only being straight. Therefore, the batteries 26, 28, 30, 32 are somewhat curved to comfortably fit on a user's wrist. The four lithium polymer batteries 26, 28, 30, 32 provide about 500 mA-hours of capacity to power the radiotelephone circuitry 90 for about 1.25 hours during a telephone call and for about 8 hours while in a standby mode waiting to receive a call.

The bracelet 16 further comprises a first bracelet section 34 and a second bracelet section 36. The first bracelet section 34 has a first end 38 and a second end 40. The first end 38 of the first bracelet section 34 is attached to a first side 42 of the housing 12. The second bracelet section 36 has a first end 44 and a second end 46. The first end 44 of the second bracelet section 36 is attached to the second side 48 of the housing 12.

The first bracelet section 34 further comprises a first link 18, a second link 20, a first electrical conductor 50 and a second electrical conductor 52. The first link 18 has a first battery 26 disposed therein. The second link 20 has a second battery 28 disposed therein. The first electrical conductor 50 couples a positive electrical charge 54 between the first battery 26 and the second battery 28. The second electrical conductor 52 couples a negative electrical charge 56 between the first battery 26 and the second battery 28.

The first bracelet section 34 also preferably includes sizing links 51 and 53 which do not batteries. These links permit a user to adjust the size of the bracelet 16 without affecting the battery capacity available to the radiotelephone circuitry 90.

The second bracelet portion 36 further comprises a third link 22, a fourth link 24, a third electrical conductor 58 and a fourth electrical conductor 60. The third link 22 has a third battery 30 disposed therein. The fourth link 24 has a fourth battery 32 disposed therein. The third electrical conductor 58 couples a positive electrical charge 62 between the third battery 30 and the fourth battery 32. The fourth electrical conductor 60 couples a negative electrical charge 64 between the third battery 30 and the fourth battery 32.

The first battery 26, the second battery 28, the third battery 30 and the fourth battery 32, provide power to the radiotelephone circuitry 90.

The wrist-carried radiotelephone 10 further comprises a latch 66 having a first clasp portion 68 and a second clasp portion 70. The first clasp portion 68 is connected to the second end 40 of the first bracelet section 34. The second clasp portion 70 is connected to the second end 46 of the second bracelet section 36. The first clasp portion 68 cooperatively engages the second clasp portion 70 to secure the first bracelet section 34 to the second bracelet section 36.

The bracelet 16 further comprises a first hinge 72 and a second hinge 74. The first hinge 72 is disposed between the first link 18 and the second link 20 and pivotably couples the first link 18 relative to the second link 20. The first electrical conductor 50 and the second electrical conductor 52 transfer the positive electrical charge 54 and the negative electrical charge 56, respectively, across the first hinge 72. The second hinge 74 is disposed between the third link 22 and the fourth link 24 and pivotably couples the third link 22 relative to the fourth link 24. The third electrical conductor 58 and the fourth electrical conductor 60 transfer the positive electrical charge 62 and the negative electrical charge 64, respectively, across the second hinge 74.

The first electrical conductor 50, the second electrical conductor 52, the third electrical conductor 58 and the fourth electrical conductor 60 each preferably comprise a pair of electrically conductive contacts disposed in an abutting relationship at the first hinge 72 and the second hinge 74 when adjacent links are mechanically coupled together. Alternatively, the first electrical conductor 50, the second electrical conductor 52, the third electrical conductor 58 and the fourth electrical conductor 60 may each comprise an electrically conductive wire which is routed through the appropriate hinge.

At least one of the first link 18, the second link 20, the third link 22 and the fourth link 24 is removable from and attachable to the bracelet 16 to adjust a size of the bracelet 16 to the user's wrist (not shown).

The wrist-carried radiotelephone 10 further comprises watch circuitry 118 (see FIG. 2), disposed in the housing 12, for providing a time of day. A watch battery 76, disposed in the housing 12, provides power only to the watch circuitry 118. Thus, in the event that the batteries 26, 28, 30, 32 for the radiotelephone are low on power, the watch circuitry 76 remains operational. A watch is a portable timepiece. Therefore, the wrist-carried radiotelephone 10 combines the functions of a portable timepiece and a radiotelephone into a single unit.

FIG. 2 illustrates a block diagram of the wrist-carried radiotelephone 10. A radiotelephone portion 90 of the wrist-carried radiotelephone 10 is preferably a cellular radiotelephone, but may also be a cordless radiotelephone or a personal communication service (PCS) radiotelephone. The radiotelephone portion 90 may be constructed in accordance with a analog communication standard or a digital communication standard. The radiotelephone portion 90 generally includes a radio frequency (RF) transmitter 92, a RF receiver 94, a controller 96, an antenna 98, batteries 26, 28, 30, 32, a duplex filter 102, a frequency synthesizer 104, and a user interface 106 including a keypad 115, control switches 110, a digital display 112, an earpiece 114 and a microphone 116. The radiotelephone portion 90 may also include a paging receiver 119. The wrist-carried radiotelephone 10 also includes watch circuitry 118 and a watch battery 76.

What is claimed is:

1. A wrist-carried radiotelephone comprising:
    a housing;
    radiotelephone circuitry disposed in the housing; and
    a bracelet, connected to the housing, for securing the housing to a user's wrist, wherein the bracelet further comprises a plurality of links, wherein each link of the plurality of links has a battery disposed therein, wherein adjacent links of the plurality of links are mechanically coupled together, wherein adjacent batteries, disposed in respective adjacent links of the plurality of links, are electrically coupled together, wherein at least two adjacent batteries provide power to the radiotelephone circuitry, and wherein at least one of the plurality of links having the battery disposed therein is removable from and attachable to the bracelet by a user of the wrist-carried radiotelephone to permit the user to adjust a size of the bracelet to the user's wrist or to charge the battery disposed in the at least one of the plurality of links.

2. A wrist-carried radiotelephone according to claim 1 wherein the bracelet further comprises:
    a first link having a first battery disposed therein;
    a second link having a second battery disposed therein;
    a first electrical conductor for coupling a positive electrical charge between the first battery and the second battery; and
    a second electrical conductor for coupling a negative electrical charge between the first battery and the second battery,
    wherein the first battery and the second battery provide power to the radiotelephone circuitry.

3. A wrist-carried radiotelephone according to claim 1 wherein the bracelet further comprises:
    a hinge, disposed between adjacent links of the plurality of links, for pivotably coupling the adjacent links relative to each other,
    wherein the first electrical conductor and the second electrical conductor transfer the positive electrical charge and the negative electrical charge, respectively, across the hinge.

4. A wrist-carried radiotelephone according to claim 1 further comprising:
    watch circuitry, disposed in the housing, for providing a time of day; and
    a watch battery, disposed in the housing, for providing power only to the watch circuitry.

5. A wrist-carried radiotelephone comprising:
    a housing;
    radiotelephone circuitry disposed in the housing; and
    a bracelet, connected to the housing, for securing the housing to a user's wrist, wherein the bracelet further comprises:
    a first link having a first battery disposed therein;
    a second link having a second battery disposed therein;
    a first electrical conductor for coupling a positive electrical charge between the first battery and the second battery;
    a second electrical conductor for coupling a negative electrical charge between the first battery and the second battery; and
    a hinge, disposed between the first link and the second link, for pivotably coupling the first link relative to the second link,
    wherein the first electrical conductor and the second electrical conductor transfer the positive electrical charge and the negative electrical charge, respectively, across the hinge.
    wherein the first battery and the second battery provide power to the radiotelephone circuitry, and
    wherein at least one of the first link having the first battery disposed therein and the second link having the second battery disposed therein is removable from and attachable to the bracelet by a user of the wrist-carried radiotelephone to permit the user to adjust a size of the bracelet to the user's wrist or to charge at least one of the first battery disposed in the first link and the second battery disposed in the second link.

6. A wrist-carried radiotelephone according to claim 5 further comprising:

watch circuitry, disposed in the housing, for providing a time of day; and a watch battery, disposed in the housing, for providing power only to the watch circuitry.

7. A wrist-carried radiotelephone comprising:

a housing having a first side disposed opposite a second side;

radiotelephone circuitry disposed in the housing;

a bracelet for securing the housing to a user's wrist, wherein the bracelet further comprises:
  a first bracelet section having a first end and a second end, wherein the first end of the first bracelet section is attached to the first side of the housing, the first bracelet section further comprises:
    a first link having a first battery disposed therein;
    a second link having a second battery disposed therein;
    a first electrical conductor for coupling a positive electrical charge between the first battery and the second battery; and
    a second electrical conductor for coupling a negative electrical charge between the first battery and the second battery; and
  a second bracelet section having a first end and a second end, wherein the first end of the second bracelet section is attached to the second side of the housing, the second bracelet portion further comprises:
    a third link having a third battery disposed therein;
    a fourth link having a fourth battery disposed therein;
    a third electrical conductor for coupling a positive electrical charge between the third battery and the fourth battery; and
    a fourth electrical conductor for coupling a negative electrical charge between the third battery and the fourth battery, wherein the first battery, the second battery, the third battery and the fourth battery, provide power to the radiotelephone circuitry, and wherein at least one of the first link, the second link, the third link and the fourth link is removable from and attachable to the bracelet by a user of the wrist-carried radiotelephone to permit the user to adjust a size of the bracelet to the user's wrist or to charge at least one of the first battery disposed in the first link, the second battery disposed in the second link, the third battery disposed in the third link and the fourth battery disposed in the fourth link.

8. A wrist-carried radiotelephone according to claim 7 further comprising:

a latch having a first clasp portion and a second clasp portion, wherein the first clasp portion is connected to the second end of the first bracelet portion, wherein the second clasp portion is connected to the second end of the second bracelet portion, wherein the first clasp portion cooperatively engages the second clasp portion to secure the first bracelet portion to the second bracelet portion.

9. A wrist-carried radiotelephone according to claim 7 wherein the bracelet further comprises:

a first hinge, disposed between the first link and the second link, for pivotably coupling the first link relative to the second link, wherein the first electrical conductor and the second electrical conductor transfer the positive electrical charge and the negative electrical charge, respectively, across the first hinge; and a second hinge, disposed between the third link and the fourth link, for pivotably coupling the third link relative to the fourth link, wherein the third electrical conductor and the fourth electrical conductor transfer the positive electrical charge and the negative electrical charge, respectively, across the second hinge.

10. A wrist-carried radiotelephone according to claim 7 further comprising:

watch circuitry, disposed in the housing, for providing a time of day; and a watch battery, disposed in the housing, for providing power only to the watch circuitry.

* * * * *